United States Patent [19]

Anderson et al.

[11] Patent Number: 5,785,028
[45] Date of Patent: Jul. 28, 1998

[54] INTERNAL COMBUSTION ENGINE WITH SPARK IGNITION AND DIRECT CYLINDER FUEL INFECTION

[75] Inventors: Richard Walter Anderson, Ann Arbor; Diana Dawn Brehob, Dearborn; James Kirkland Vallance, Northville; Robert M. Whiteaker; Jialin Yang, both of Canton, all of Mich.

[73] Assignee: Ford Global Technologies, Inc., Dearborn, Mich.

[21] Appl. No.: 667,999

[22] Filed: Jun. 19, 1996

Related U.S. Application Data

[63] Continuation of Ser. No. 225,268, Apr. 8, 1994, abandoned.
[51] Int. Cl.⁶ .................................................. F02D 5/00
[52] U.S. Cl. .............................. 123/193.3; 123/305
[58] Field of Search .................. 123/193.3, 193.5, 123/294, 305

[56] References Cited

U.S. PATENT DOCUMENTS

| | | | |
|---|---|---|---|
| 1,988,754 | 1/1935 | Sleffel | 123/305 |
| 4,480,620 | 11/1984 | Tange et al. | 123/305 |
| 4,763,622 | 8/1988 | Indra et al. | |
| 4,844,030 | 7/1989 | McAvoy | 123/294 |
| 5,078,107 | 1/1992 | Morikawa | 123/305 |
| 5,148,781 | 9/1992 | Piatti | 123/193.5 |
| 5,249,557 | 10/1993 | Katoh et al. | 123/305 |
| 5,329,902 | 7/1994 | Sakamoto et al. | 123/305 |
| 5,335,635 | 8/1994 | Kadoi et al. | 123/305 |
| 5,363,820 | 11/1994 | Neitz | 123/294 |
| 5,373,820 | 12/1994 | Sakamoto et al. | 123/305 |

FOREIGN PATENT DOCUMENTS

| | | | |
|---|---|---|---|
| 0249699 A2 | 3/1987 | European Pat. Off. | |
| 0311877 | 4/1989 | European Pat. Off. | 123/193.3 |
| 0985370 | 12/1982 | U.S.S.R. | 123/193.3 |
| 1377432 | 2/1988 | U.S.S.R. | 123/193.3 |
| WO 94/21904 | 9/1994 | WIPO | |

*Primary Examiner*—Marguerite McMahon
*Attorney, Agent, or Firm*—Neil P. Ferraro

[57] ABSTRACT

A piston-type, multicylinder internal combustion engine includes a cylinder block and a cylinder head mounted thereto, with a combustion chamber defined by the cylinder head and the top of the piston, with the engine being fueled by an an in-cylinder gasoline injection system which is centrally located with a spark plug such that the spark plug is closer to exhaust valves than is the injector, and with the injector being closer to the intake valves than the spark plug.

18 Claims, 3 Drawing Sheets

5,785,028

INTERNAL COMBUSTION ENGINE WITH SPARK IGNITION AND DIRECT CYLINDER FUEL INJECTION

This is a continuation of application Ser. No. 08/225,268 filed Apr. 8, 1994 abandoned.

BACKGROUND OF THE INVENTION

1. Field of the Invention

The present invention relates to a spark-ignited internal combustion engine in which fuel, in this case, gasoline, is injected directly into the combustion chamber.

2. Disclosure Information

Direct cylinder fuel injection used with spark ignited gasoline engines has been pursued by engine designers and manufacturers for many years. This pursuit has been characterized by a notable lack of success. Most efforts directed to have spark ignited, direct injected engines have utilized flat or fairly flat cylinder heads with the combustion chamber formed as a cup in the piston. Examples of these are engines produced by Ford, under the name "PROCO", as well as by Texaco, Toyota, International Harvester, and White. MCP and MAN-FM have also produced engines having direct cylinder injection of gasoline, spark ignition and a combustion chamber formed as a cup in the piston. Unfortunately, the combustion chamber-in-piston designs suffer from a lack of high speed capability because of the large reciprocating mass which must be incorporated in the piston. Another problem with bowl-in-piston designs is that heat transfer through the piston will in many cases cause reduced thermal and volumetric efficiency and also increase tendency to knock as a result of higher end-gas temperatures.

Cylinder head surfaces generally operate at lower temperatures than do the combustion chamber surfaces of pistons. This results from the relatively low amount of cooling available to the piston, as compared with the water cooling available to the cylinder head, at least insofar as liquid-cooled engines are concerned. With bowl-in-piston designs, more of the gas within the combustion chamber is in contact with the hotter piston, and the end-gases are heated accordingly.

Although some engine designs have been tried with fairly flat pistons such as one Ricardo and an FEV design, these too, are deficient. In the first case, the Ricardo design uses an electronically controlled injector which sprays from the side of the chamber and thereby produces undesirable fuel dispersion characteristics. Having the injector at the periphery of the combustion chamber requires that the fuel traverse the entire combustion chamber to completely access the required combustion air. If relatively complete mixing of the fuel air is not achieved, the engine will suffer from low power. With the previously mentioned FEV design, although the injector is located at or near the center line of the cylinder, the spark plug is separated from the exhaust valve by the injector, and this will unfortunately cause a tendency towards knocking, or autoignition because initiation of the combustion event at the spark plug will cause the compression of end gases at the location of the exhaust valve, which is usually the hottest part of the combustion chamber, thereby tending to increase problems with autoignition. An additional drawback to the FEV design resides in the fact that only two valves are used, and both are of relatively small diameter. As a result, the power output of the engine is impaired.

An engine according to the present invention is intended to provide direct cylinder injection of gasoline without these drawbacks. This is accomplished by positioning the spark plug closer to the exhaust valves than the position of the injector with respect to the exhaust valves, and by having an asymmetric combustion chamber with a greater volume concentrated about the cooler intake valves as opposed to the hotter exhaust valves.

SUMMARY OF THE INVENTION

A reciprocating, multicylinder internal combustion engine includes, for each cylinder, a cylinder block having a piston reciprocably housed in a cylindrical bore formed therein, with the cylinder bore having a central axis, a cylinder head mounted to the cylinder block so as to close the outer end of the cylinder bore, and a combustion chamber defined by the cylinder head and the top of the piston. At least one intake and one exhaust valve are used, with each being mounted within the cylinder head. Finally, a spark plug and a fuel injector project through the top of the cylinder head's fire deck, and into the combustion chamber within a common region extending between the intake and exhaust valves. The spark plug and injector are disposed such that the spark plug is closer to the exhaust valve than is the injector, and the injector is closer to the intake valve than is the spark plug. Two intake valves and two exhaust valves may be used, with the intake valves being mounted to one side of the cylinder's central axis and the exhaust valves mounted within the opposing half of the cylinder head. The region in which the spark plug and the fuel injector project through the cylinder head lies within a quadrilateral area generally defined by the intersections of the axes of the four intake and exhaust valves with the cylinder head face. The spark plug and fuel injector may be mounted within a single boss located about the central axis of the cylinder and extending upwardly from the fire deck of the cylinder head, with the cylinder head further comprising passages for circulating engine coolant about the periphery of the boss. The intake and exhaust valves are mounted within the cylinder head such that the included angle between the plane of the exhaust valve axes and the central axis of the cylinder is greater than the included angle between the plane of the intake valve axes and the central axis of the cylinder. This results in asymmetrical combustion chamber having a greater volume in proximity to the intake valve or valves and a lesser volume in proximity to the exhaust valve or valves. Each cylinder also includes at least one intake port, with the port comprising a passage having a generally circular cross-section at the intake manifold mounting surface, with the passage transitioning to an oblong shape of reduced sectional area at the location of the intake valve guide, and with the passage area increasing downstream of the valve guide according to a diffuser angle of 7° to 8°, while transitioning to a circular section at the valve seat.

It is an advantage of the present invention that an engine equipped with a combustion chamber, fuel injection system and spark plug location according to the present invention will exhibit high volumetric and thermal efficiencies, while exhibiting reduced octane sensitivity, as compared with other types of direct injection, gasoline-fueled, spark-ignited engines.

DETAILED DESCRIPTION OF THE PREFERRED EMBODIMENTS

Figure 1:
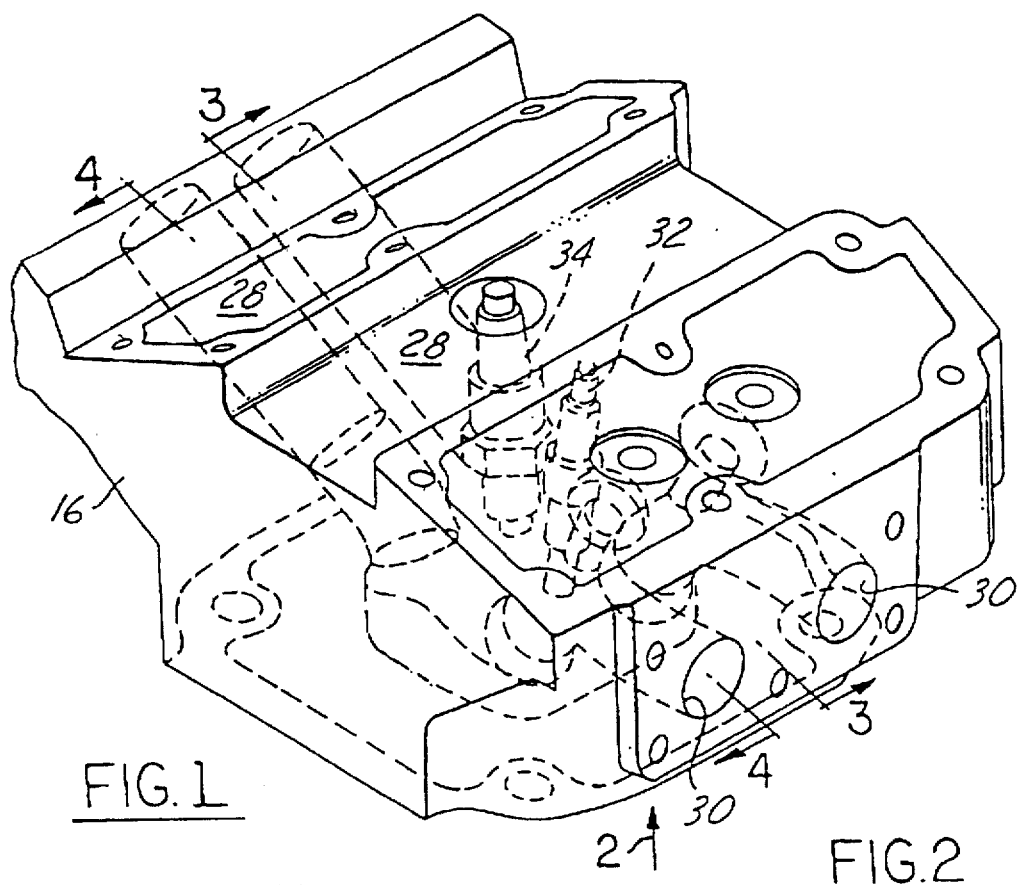
FIG. 1 is a perspective view of an engine cylinder head constructed according to the present invention.
Figure 3:
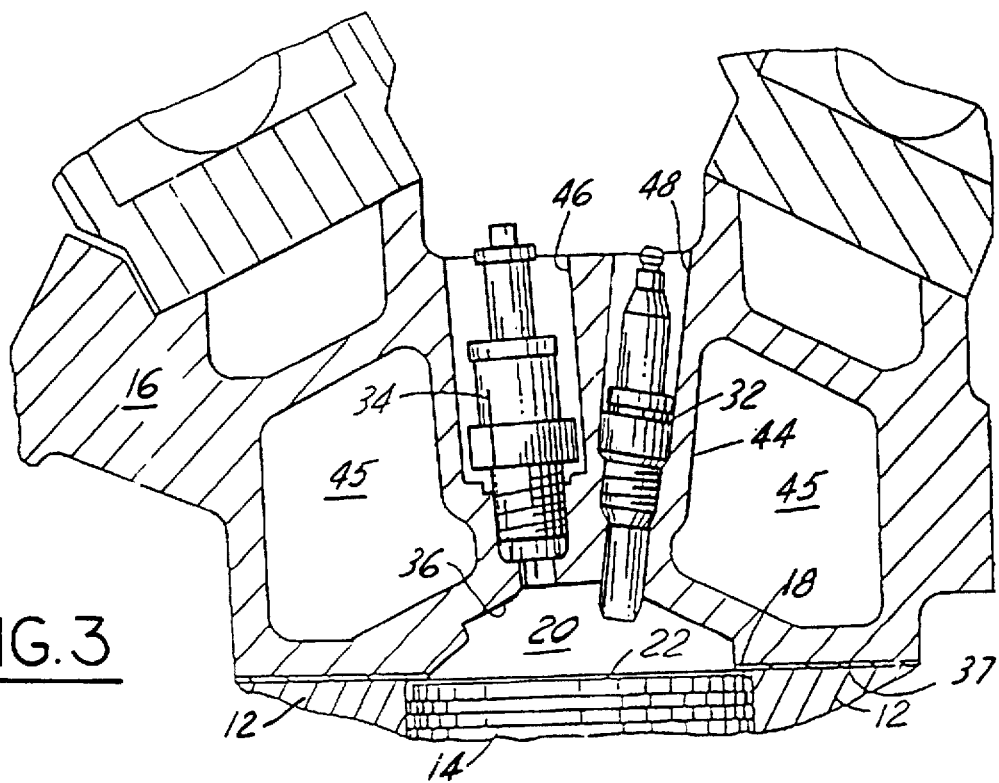
FIG. 3 is a sectional view of an engine according to the present invention, including the cylinder head of FIG. 1, taken along the line 3—3 of FIG. 1.
Figure 4:
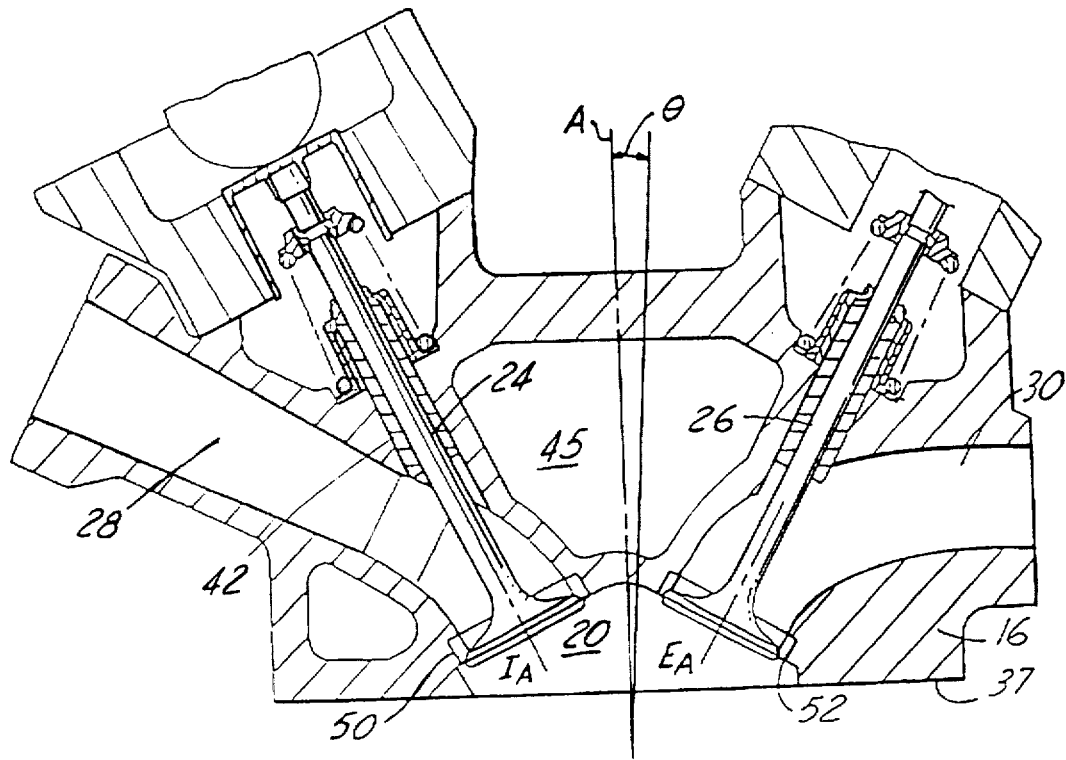
FIG. 4 is a sectional view of the cylinder head of FIG. 1, taken along the line 4—4 of FIG. 1.

As shown in FIG. 1, cylinder head 16 according to the present invention has spark plug 32 and gasoline fuel injector 34, both of which are centrally mounted. Two intake ports 28 serve to provide air to the combustion chamber, and two exhaust ports 30 conduct spent gases from the combustion chamber. As shown in FIGS. 3 and 4, combustion chamber 20 is housed entirely within cylinder head 16. Accordingly, the top of the piston, 22, is flat. Those skilled in the art will appreciate in view of this disclosure, however, that piston 14 could have a slight dome, or even a slight recess, if required to accommodate the characteristics of an engine being designed with a combustion system according to the present invention. In conventional practice, a plurality of pistons 14 is housed within an equal number of bores 18 formed in cylinder block 12.

An engine according to the present invention offers superior octane capability because the engine may be operated with lower octane fuels without autoignition occurring. This is true for two reasons. First, as shown in FIG. 4, the included angle between the plane of the exhaust valve axes, $E_A$, and the central axis, A, of cylinder bore 18, is greater than the included angle between the plane of the intake valve axes, $I_A$, and central axis A. This offset, which is labeled θ, and which is about 2° to 3°, causes an asymmetry in combustion chamber 20 such that a greater volume of the combustion chamber is in proximity to intake valves 24 and a lesser volume is in proximity to exhaust valves 26. Notice also from FIGS. 2 and 3 that the distance between spark plug 32 and exhaust valves 26 is less than the distance between injector 34 and exhaust valves 26. This, coupled with the asymmetrical volume of combustion chamber 20, means that the combustion event is initiated in a region of the cylinder which is adjacent the exhaust valve heads, which typically comprise the hottest part within the combustion chamber. As a result, as the combustion event progresses with corresponding compression of the unburned gases in the cylinder, the amount of unburned mass will be greatest in the area of the intake valves, which typically comprise a cooler portion of the combustion chamber, and as a result, autoignition will be much less of a problem if any, for a combustion chamber and system according to the present invention. Also, having a greater volume of the combustion chamber located adjacent to the intake valves means that the potential for autoignition will once again be greatly mitigated. The previously described 2° to 3° offset is utilized to provide improved orientation for injector 34; the injector's axis is nearly parallel to central axis A. This helps to produce even fuel distribution about the combustion chamber, while avoiding wall-wetting. An additional advantage to the cylinder head orientation is that the size of the intake valve mask may be increased, resulting in improved turbulence, if desired.

Figure 5:
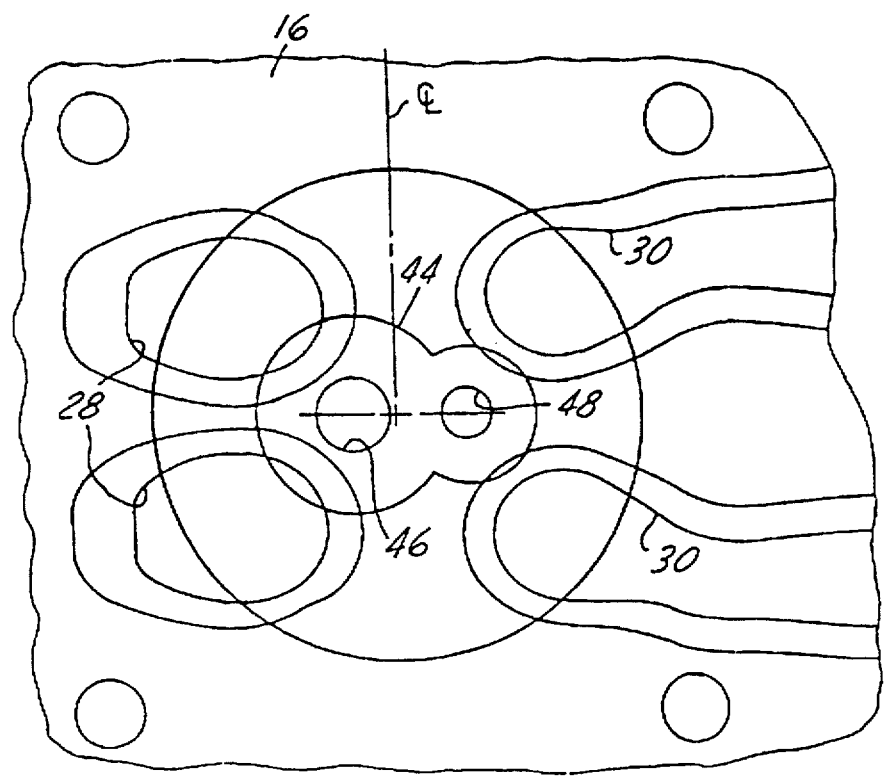
FIG. 5 is a plan view, partially schematic representation of a cut-away portion of the cylinder head of previous figures, showing with specificity an injector and spark plug mounting boss.

Additional details of the mounting of spark plug 32 and injector 34 are shown in FIGS. 3 and 5. Both the spark plug and the injector are mounted within boss 44, which is located about central axis A of the cylinder, and which extends upwardly from fire deck 36 of cylinder head 16. As seen from FIGS. 3 and 4, a single water passage 45 completely surrounds boss 44, so that excellent cooling of boss 44 is achieved. This tends to avoid overheating of the spark plug and fuel injector, with the result that coking on the injector is minimized.

Figure 2:
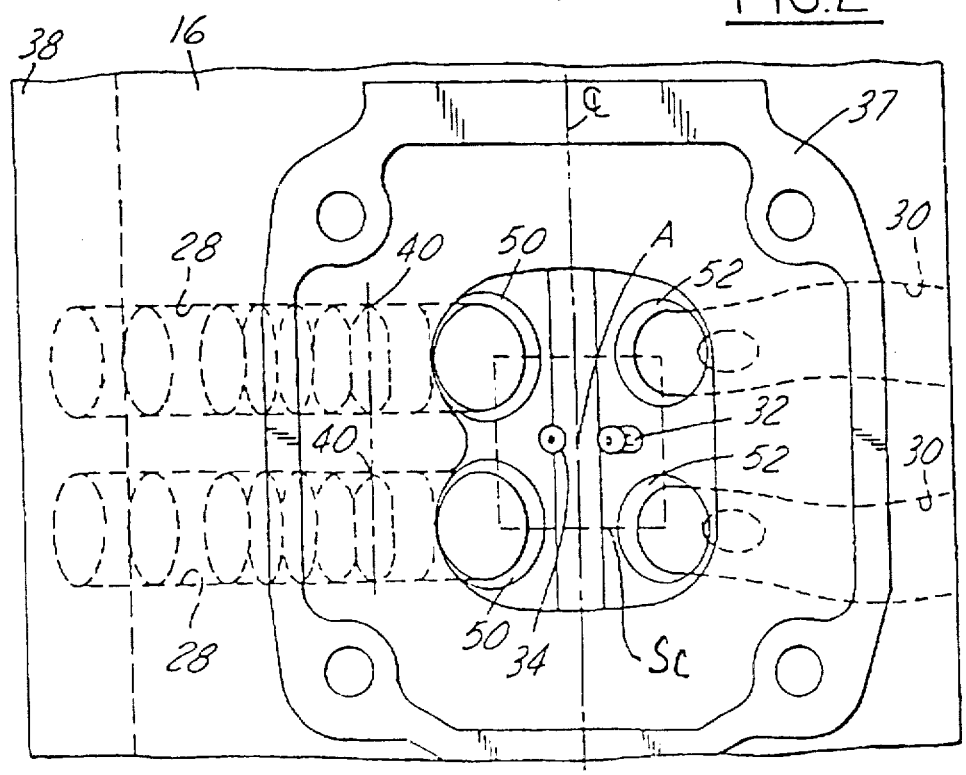
FIG. 2 is a plan view taken from the cylinder, or underside, of the cylinder head of FIG. 1.

FIG. 2 illustrates region $S_C$, at the center of combustion chamber 20, wherein spark plug 32 and injector 34 are located. As illustrated, region $S_C$ is a quadrilateral which is generally defined by the intersections of axes $I_A$ and $E_A$ with cylinder head face 37 (FIGS. 2 and 4).

Another feature of the present combustion chamber is illustrated in FIG. 2, wherein it is shown that intake ports 28 and exhaust ports 30 are mounted on opposite sides of the crankshaft centerline, $C_L$. FIG. 2 also shows the configuration of intake ports 28. At intake manifold mounting surface 38, the configuration of intake port 28 is generally circular. Note that the cross-sectional area transforms into a non-circular shape, preferably an oblong shape which has a reduced sectional area at location, 40 which is in the area in which intake valve guide 42 (FIG. 4) projects into the port passage. The cross-sectional area is gradually reduced along the passage from manifold mounting surface 38 to location 40. At location 40, the major axis of the oblong shape is generally parallel to the crankshaft centerline, $C_L$.

Downstream of valve guide 42, intake port passage 28 transforms to a round shape at valve seat 50. This retro-transition to a circular cross-section is accompanied by an increase in cross-sectional area according to a diffuser angle of 7° to 8°. Accordingly, as induction air moves through passage 28 inwardly from manifold mounting face 38, the flow is first accelerated to the position at which valve guide 42 is reached (FIG. 4). Thereafter, the flow is diffused so as to increase the pressure.

It has been determined that an intake port according to the present invention will work well with some combustion chamber configurations with masked valves. The present port and combustion chamber are further beneficial because it is possible to achieve a size relationship between the cylinder bore cross-sectional area and the intake and exhaust valve cross-sectional areas such that the intake valve cross-sectional area divided by the bore cross sectional area is 0.24 or greater, while maintaining the ratio of the exhaust valve cross-sectional area to the intake valve cross-sectional area of approximately 0.77. The latter value is typical of 2 and 4-valve port fuel injected engines. It is significant here that the foregoing ratios are maintained with an engine having a centrally located spark plug and fuel injector. Moreover, present ports could be used with an engine having conventional port fuel injection. These and other changes and modifications occurring to those skilled in the art in view of this disclosure may be made to the present invention without departing from the scope of the following claims.

What is claimed:

1. A reciprocating, multicylinder internal combustion engine, with each cylinder comprising:
   a cylinder block having a piston reciprocably housed in a cylindrical bore formed therein, with the cylinder bore having a central axis;
   a cylinder head mounted to said cylinder block so as to close the outer end of the cylinder bore;
   a combustion chamber defined by the cylinder head and The top of the piston;
   at least one intake valve mounted within the cylinder head;
   at least one exhaust valve mounted within the cylinder head; a spark plug and a fuel injector projecting through the fire deck of the cylinder head and into the combustion chamber within a common region extending between the intake and exhaust valves, with the spark plug and the injector being disposed such that the spark plug is closer to said at least one exhaust valve than is the injector, and the injector is closer to said at least one intake valve than is the spark plug, wherein the spark plug and fuel injector are mounted within a single boss located about the central axis of the cylinder and extending upwardly from the fire deck of the cylinder head, with the cylinder head further comprising a single passage completely surrounding said boss for circulating engine coolant thereabout; and at least one intake port formed within the cylinder head, with said port comprising a passage having a generally circular section at the intake manifold mounting surface, with the passage transitioning to a non-circular shape of reduced sectional area at the location of the intake valve guide, and with the passage area increasing downstream of the valve guide according to a diffuser angle of 7° to 8° while transitioning to a circular section at the valve seat.

2. An engine according to claim 1, wherein each cylinder has two intake valves mounted to one side of the cylinder's central axis and two exhaust valves mounted within the opposing half of the cylinder head.

3. An engine according to claim 2, wherein the region in which said spark plug and said fuel injector project through the cylinder head lies within a quadrilateral area generally defined by the intersections of the axes of the four intake and exhaust valves with the cylinder head face.

4. An engine according to claim 1, wherein the intake and exhaust valves are mounted within the cylinder head such that the included angle between the plane of the exhaust valve axes and the central axis of the cylinder is greater than the included angle between the plane of the intake valve axes and the central axis of the cylinder.

5. An engine according to claim 1, wherein said combustion chamber is asymmetrical and has a greater volume in proximity to said at least one intake valve and a lesser volume in proximity to said at least one exhaust valve.

6. A reciprocating, multicylinder internal combustion engine, with each cylinder comprising:

a cylinder block having a piston reciprocably housed in a cylindrical bore formed therein, with the cylinder bore having a central axis;

a cylinder head mounted to said cylinder block so as to close the outer end of the cylinder bore;

a combustion chamber defined by the cylinder head and the top of the piston;

at least two intake valves mounted within the cylinder head;

at least two exhaust valves mounted within the cylinder head;

a spark plug and a fuel injector projecting through the fire deck of the cylinder head and into the combustion chamber within a common region extending between the intake and exhaust valves, with the spark plug and the injector being disposed such that the spark plug is closer to said at least two exhaust valves than is the injector, and the injector is closer to said at least two intake valves than is the spark plug, wherein the spark plug and fuel injector are mounted within a single boss located about the central axis of the cylinder and extending upwardly from the fire deck of the cylinder head, with the cylinder head further comprising a single passage completely surrounding said boss for circulating engine coolant thereabout; and at least two intake ports formed within the cylinder head, with said ports each comprising a passage having a generally circular section at the intake manifold mounting surface, with the passage transitioning to an oblong shape of reduced sectional area at the location of the intake valve guide, and with the passage area increasing downstream of the valve guide according to a diffuser angle of 7° to 8° while transitioning to a circular section at the valve seat.

7. An engine according to claim 6, wherein each cylinder has two intake valves mounted to one side of the cylinder's central axis and two exhaust valves mounted within the opposing half of the cylinder head.

8. An engine according to claim 7, wherein the region in which said spark plug and said fuel injector project through the cylinder head lies within a quadrilateral area defined by the intersections of the axes of the four intake and exhaust valves with the cylinder head face.

9. An engine according to claim 6, wherein the intake and exhaust valves are mounted within the cylinder head such that the included angle between the plane of the exhaust valve axes and the central axis of the cylinder is greater than the included angle between the plane of the intake valve axes and the central axis of the cylinder.

10. An engine according to claim 6, wherein said combustion chamber is asymmetrical and has a greater volume in proximity to the intake valves and a lesser volume in proximity to the exhaust valves.

11. A reciprocating, multicylinder, gasoline fueled internal combustion engine, with each cylinder comprising:

a cylinder block having a piston reciprocably housed in a cylindrical bore formed therein, with the cylinder bore having a central axis;

a cylinder head mounted to said cylinder block so as to close the outer end of the cylinder bore;

a combustion chamber defined by the cylinder head and the top of the piston, with the volume of the combustion chamber being housed within the cylinder head;

two intake valves mounted within the cylinder head, with said valves being mounted to one side of the engine's crankshaft centerline;

two exhaust valves mounted within the cylinder head, with said exhaust valves being mounted to the side of the engine's crankshaft centerline which is opposite to the side occupied by the intake valves;

a spark plug and a fuel injector projecting through the fire deck of the cylinder head and into the combustion chamber within a common region extending between the intake and exhaust valves, with the spark plug and the injector being disposed such that the spark plug is closer to said exhaust valves than is the injector, and the injector is closer to said intake valves that is the spark plug, wherein the spark plug and fuel injector are mounted within a single boss located about the central axis of the cylinder and extending upwardly from the fire deck of the cylinder head, such that the axis of the injector is nearly parallel with the central axis of the cylinder, with the cylinder head further comprising a single passage completely surrounding said boss for circulating engine coolant thereabout; and two intake ports formed within said cylinder head with each of said ports comprising a passage having a generally circular section at the intake manifold mounting surface, with the passage transitioning to an oblong shape of reduced sectional area at the location of the intake valve guide, and with the passage area increasing downstream of the valve guide according to a diffuser angle of 7° to 8° while transitioning to a circular section at the valve seat, with said oblong shape having a major axis which is generally parallel to the centerline of the engine's crankshaft.

12. An engine according to claim 11, wherein the region in which said spark plug and said fuel injector project through the cylinder head lies within a quadrilateral area defined by the intersections of the axes of the four intake and exhaust valves with the cylinder head face.

13. An engine according to claim 11, wherein the intake and exhaust valves are mounted within the cylinder head such that the included angle between the plane of the exhaust valve axes and the central axis of the cylinder is greater than the included angle between the plane of the intake valve axes and the central axis of the cylinder.

14. An engine according to claim 13, wherein the included angle between the plane of the exhaust valve axes and the central axis of the cylinder is greater than the included angle between the plane of the intake valve axes and the central axis of the cylinder by 2° to 3°.

15. An engine according to claim 11, wherein said combustion chamber is asymmetrical and has a greater volume in proximity to said intake valves and a lesser volume in proximity to said exhaust valves.

16. An engine according to claim 11, wherein the top of the piston is generally flat.

17. A reciprocating, multicylinder, gasoline fueled internal combustion engine, with each cylinder comprising:

a cylinder block having a flat top piston reciprocably housed in a cylindrical bore formed therein, within the cylinder bore having a central axis;

a cylinder head mounted to said cylinder block so as to close the outer end of the cylinder bore;

a combustion chamber defined by the cylinder head and the top of the piston;

two exhaust valves mounted within the cylinder head, with said exhaust valves being mounted to one side of the engine's crankshaft centerline;

two intake valves mounted within the cylinder head to the side of the engine's crankshaft centerline which is opposite to the side occupied by the exhaust valves so as to control the flow of intake charge through an intake port, with said port comprising a passage having a generally circular section at the intake manifold mounting surface, with the passage transitioning to an oblong shape of reduced sectional area at a location of the intake valve guide, and with the passage area increasing downstream of the valve guide according to a diffuser angle of 7° to 8° while transitioning to a circular section at the valve seat; and, a spark plug and a fuel injector projecting through the fire deck of the cylinder head and into the combustion chamber within a common region extending between the intake and exhaust valves, with the spark plug and the injector being disposed such that the spark plug is closer to said exhaust valves than is the injector, and the injector is closer to said intake valves than is the spark plug, wherein the spark plug and fuel injector are mounted within a single boss located about the central axis of the cylinder and extending upwardly from the fire deck of the cylinder head, such that the axis of the injector is nearly parallel with the central axis of the cylinder, with the cylinder head further comprising a single passage completely surrounding said boss for circulating engine coolant thereabout.

18. An engine according to claim 1, wherein said non-circular shape is an oblong shape.

* * * * *